United States Patent

Ligthart et al.

[11] Patent Number: 5,818,318
[45] Date of Patent: Oct. 6, 1998

[54] MAGNETIC CLAMPING DEVICE

[75] Inventors: Henricus J. Ligthart; Petrus H. W. Swinkels; Jakob Vijfvinkel, all of Eindhoven, Netherlands

[73] Assignee: U.S. Philips Corporation, New York, N.Y.

[21] Appl. No.: 662,712

[22] Filed: Jun. 10, 1996

[30] Foreign Application Priority Data

Jun. 15, 1995 [EP] European Pat. Off. .............. 95201593

[51] Int. Cl.⁶ ................................... B23B 31/28
[52] U.S. Cl. ................................ 335/295; 269/8; 335/285
[58] Field of Search ..................................... 335/285, 295; 269/8, 20, 310, 309; 294/65.5; 279/128

[56] References Cited

U.S. PATENT DOCUMENTS 5,080,380 1/1992 Nakagawa et al. .................... 279/1 M

FOREIGN PATENT DOCUMENTS

0562670A1 9/1993 European Pat. Off. ........... H01J 9/14
926678 5/1963 United Kingdom ................... 335/285

Primary Examiner—Michael L. Gellner
Assistant Examiner—Raymond Barrera
Attorney, Agent, or Firm—Robert J. Kraus

[57] ABSTRACT

The invention relates to a magnetic clamping device with a clamping body (1) comprising a cylinder plate (2) of non-magnetizable material provided with cylinders (5), a clamping plate (3) of non-magnetizable material situated at one side of the cylinder plate, a closing plate (4) situated at the other side of the cylinder plate, and pistons (9) made at least partly from magnetic material which are movable in the respective cylinders, which clamping body is further provided with channels (13, 14) to which a fluidic pressure source can be connected for the simultaneous movement of the pistons in the cylinders towards and away from the clamping plate. To improve the magnetic clamping action, all magnetic pistons (9) are fastened to a common piston plate (8). This ensures that all magnetic pistons, when energized, will exert their magnetic influence on the object to be clamped.

7 Claims, 2 Drawing Sheets

MAGNETIC CLAMPING DEVICE

BACKGROUND OF THE INVENTION

1. Field of the Invention

The invention relates to a magnetic clamping device with a clamping body comprising a cylinder plate of non-magnetizable material provided with cylinders, a clamping plate of non-magnetizable material situated at one side of the cylinder plate, a closing plate situated at the other side of the cylinder plate, and pistons made at least partly from magnetic material which are movable in the respective cylinders. The clamping plate is further provided with channels to which a fluidic pressure source can be connected for the simultaneous movement of the pistons in the cylinders towards and away from the clamping plate.

2. Description of the Related Art

Such a magnetic clamping device is known from U.S. Pat. No. 5,080,380. All magnetic pistons move individually in their respective cylinders during switching on and off of this clamping device. It may occur then that some pistons do not move satisfactorily, for example owing to pollution. In most cases, sticking of one or several pistons will have very little influence on the total magnetic clamping force. However, there are also technological applications where a homogeneous attraction force is required. An example of such an application is described in EP-A-0 562 670, relating to a method of providing holes in a plate of electrically insulating material, for example a thin glass plate. A metal mask provided with a pattern of holes is laid on the glass plate, whereupon abrasive powder particles are blasted onto the mask by means of a blasting system so that the powder particles hit the glass plate through the holes of the mask and thus cause cavities or holes in the glass plate. The holes in the glass plate must be provided with high accuracy. It is very important, accordingly, that the mask should lie perfectly flat on the glass plate and remains securely pressed against the glass plate also during the operation. To achieve that the mask will lie flat against the glass plate, a magnetic clamping device as described in U.S. Pat. No. 5,080,380 may be used. Since work takes place in this application in an ambience with very fine powder, it is possible that the powder also penetrates the clamping device, whereby the movement of the magnetic pistons can be adversely affected. An imperfect functioning of pistons causes the magnetic force at the areas of the pistons to be sub-optimal, so that an air gap may arise between the mask and the glass plate, especially during blasting of the mask. An inadequate contact between the mask and the glass plate causes inaccurate holes, especially near the hole edges.

SUMMARY OF THE INVENTION

The invention has for its object to provide a solution to the above problem.

The invention is for this purpose characterized in that all pistons are fastened to a common piston plate.

This ensures that all pistons will move up and down simultaneously. All magnetic pistons without exception will bear on the clamping plate for exerting a homogeneous magnetic clamping force on an object positioned on the clamping plate. Another advantage is that for switching, i.e. moving the magnetic pistons up and down, less pressure is required than in the clamping device of U.S. Pat. No. 5,080,380, because the surface area of the piston plate on which the pressure is exerted is greater than the total surface area of the separate pistons together in the cited. U.S. Patent.

Another advantage is that no stringent requirements are imposed on the tolerance of the pistons and cylinders because switching now takes place by means of the piston plate. The magnets, which are manufactured from sintered material and accordingly have a wide tolerance, fit with wide clearance in the cylinders. In fact, the magnets do not operate as pistons proper, in contrast to U.S. Pat. No. 5,080,380, where the magnets do have to operate as real pistons and accordingly must have a narrow tolerance. The magnets are embedded in a different material probably for this reason. Yet another advantage is that the closing plate in the present invention may be a flat plate, whereas a kind of bridging passages between the cylinders are provided in the closing plate of U.S. Pat. No. 5,080,380 to render it possible to exert pressure on all pistons. The clamping device according to the invention can be manufactured more inexpensively thanks to the measures mentioned above.

Preferably, the piston plate is manufactured at least partly from magnetizable steel. The advantage of this over U.S. Pat. No. 5,080,380 is that a good magnetic field arises also at the lower side, so that a satisfactorily closed magnetic field is obtained.

BRIEF DESCRIPTION OF THE DRAWINGS

The invention will now be explained in more detail with reference to an embodiment shown in a drawing, in which.

DETAILED DESCRIPTION OF THE PREFERRED EMBODIMENTS

Figure 1:
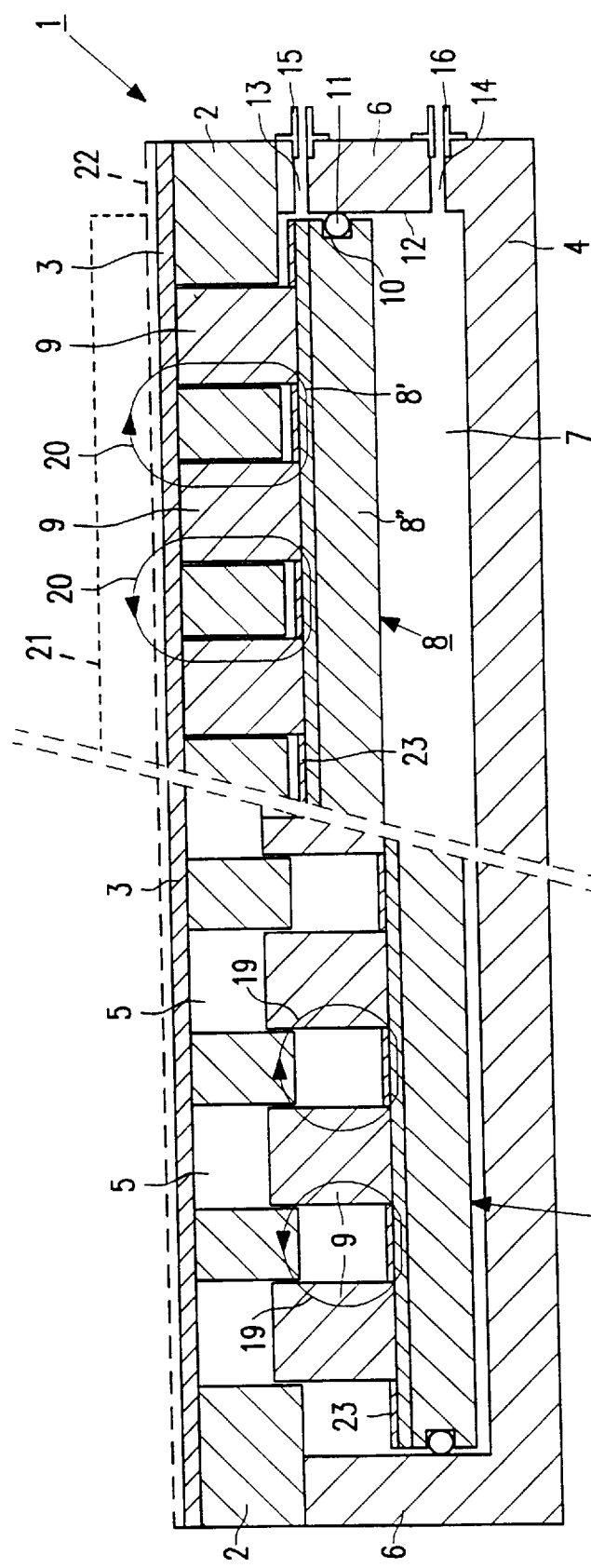
FIG. 1 is a cross-section of the clamping device.
Figure 2:
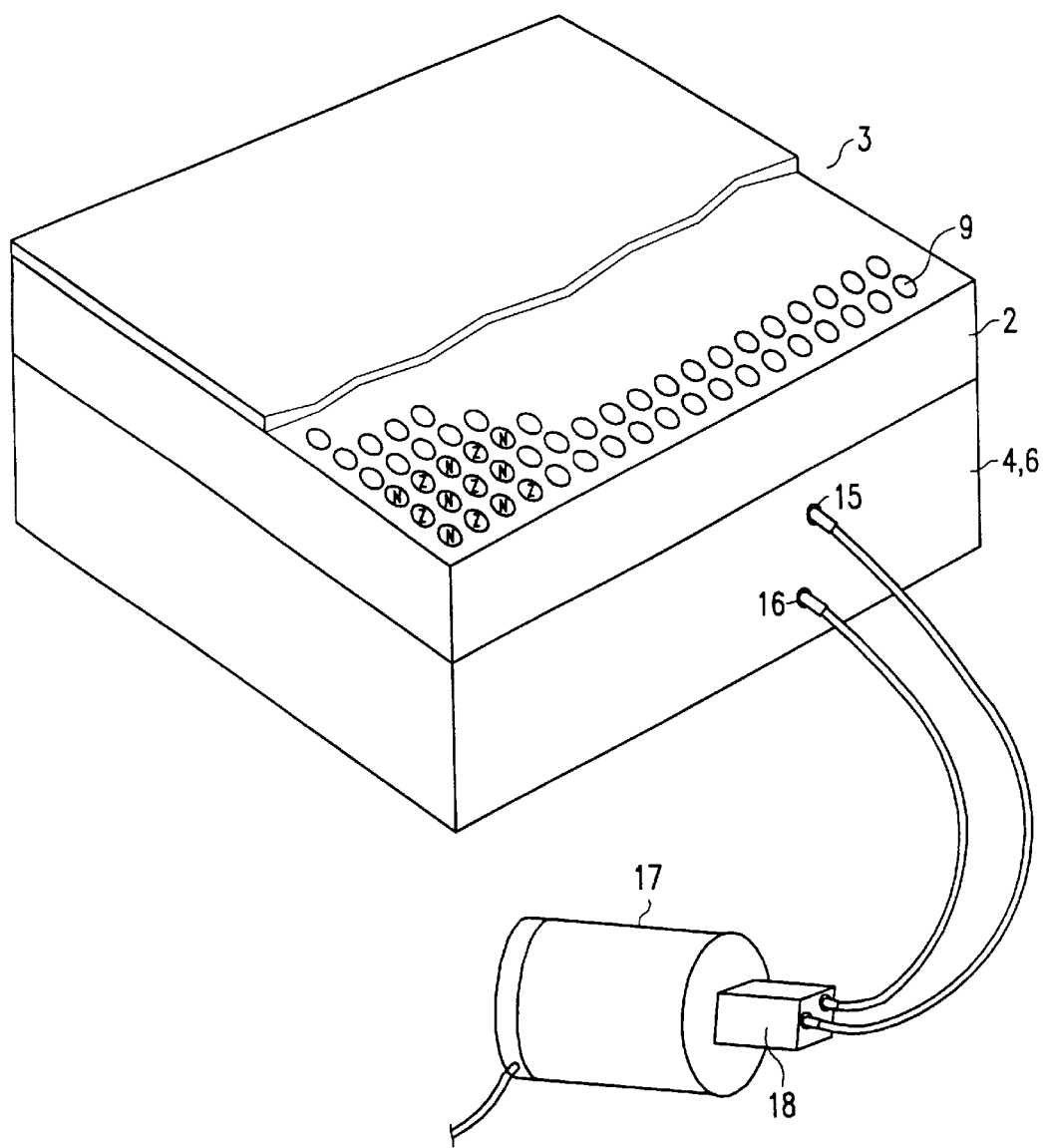
FIG. 2 is a perspective view of the clamping device, partly broken away.

The magnetic clamping device has a clamping body 1 which is built up from a cylinder plate 2 with a clamping plate 3 at one side and a closing plate 4 at the other side. The cylinder plate may be manufactured from a non-magnetizable material such as brass, aluminum, non-magnetic stainless steel, or a multilayer built up from glass fibers. A plurality of holes, i.e. cylinders 5, are present in the cylinder plate. The cylinders are provided in a regular pattern. The clamping plate 3, also of non-magnetizable material, closes the cylinders 5 at one side. The clamping plate must be strong enough for withstanding the switching pressure and may accordingly be made from, for example, thin copper of a few tenths of a millimeter thickness. The clamping plate may be fastened to the cylinder plate by welding or gluing. The objects to be clamped are placed on the clamping plate. The closing plate 4 has raised side walls 6 which bear on the cylinder plate, so that a hollow space 7 is created in the clamping body. A movable piston plate 8 is present in this hollow space, on which plate a plurality of magnetic pistons 9 are fastened in a pattern corresponding to the pattern of holes of the cylinders in the cylinder plate. The piston plate 8 with the pistons 9 thereon can be moved up and down in the hollow space 7, during which each piston 9 will slide up and down in its respective cylinder 5. Possible magnetic materials for the pistons 9 are, for example, NdFeB and SmCo. The magnetic pistons are provided, for example, in a checkerboard pattern, i.e. next to each north pole facing upwards there is a south pole facing upwards. Preferably, the piston plate 8 is made from magnetizable steel. A good short-circuiting of the magnetic field arises thereby at the lower side. In addition, a good adhesion of the magnetic pistons is obtained then. The piston plate a may be formed in that a thin layer 8' of, for example, 1 mm of magnetizable steel is provided on an aluminum base layer 8" for obtaining a lower weight.

A sealing ring 11 is present in a circumferential groove 10 of the piston plate, sealing the piston plate against the inner wall 12 of the raised side walls 6. The clamping body is provided with two channels 13, 14 with connections 15, 16 to which a fluidic pressure source, for example an HP-air pump 17, may be connected. The channels are situated on either side of the sealing ring 11. An air pressure may be applied either to channel 13 or to channel 14 by means of a valve device 18. FIG. 1 shows at the left-hand side the situation in which the pressure is applied to channel 13 and the magnetic clamping device is not energized. The magnetic field of forces 19 is below the clamping plate 3. On the right in FIG. 1 the situation is visible in which the pressure is applied to channel 14 and not to channel 13. The pressure thus arising below the piston plate 8 presses the piston plate with the magnetic pistons into its uppermost position, and the clamping device is magnetically energized. Magnetizable objects, such as metal masks, are pulled tightly against the flat clamping plate 3 in this position. The magnetic field of forces 20 is now closed via the object 21. It is not necessary in this position to maintain the pressure under the piston plate. The switching speed from the one to the other position may be controlled by means of throttle valves.

If so desired, a protective foil 22 may be provided on the clamping plate, for example a blast-resistant foil. A thin isolation plate 23 with a pattern of holes may in addition be provided on the piston plate 8. The pattern of holes corresponds to the pattern of holes in the cylinder plate 2. The isolation plate is manufactured from a non-magnetizable material. The magnetic pistons 9 are placed in the holes of the isolation plate. This prevents the magnetic pistons from moving towards one another. Said isolation plate may also serve as a placement template for the magnetic pistons during mounting of the clamping device.

We claim:

1. A magnetic clamping device with a clamping body comprising a cylinder plate of non-magnetizable material provided with cylinders, a clamping plate of non-magnetizable material situated at one side of the cylinder plate, a closing plate situated at the other side of the cylinder plate, and pistons made at least partly from magnetic material which are movable in the respective cylinders, which clamping body is further provided with channels to which a fluidic pressure source can be connected for the simultaneous movement of the pistons in the cylinders towards and away from the clamping plate, said pistons being fastened to a common piston plate manufactured at least partly from magnetizable steel, said clamping device further comprising an isolation plate of non-magnetizable material situated on said piston plate, said isolation plate having openings corresponding to the pistons, in which openings the pistons are present, the pistons being fastened to the piston plate by magnetic force.

2. A magnetic clamping device comprising a cylinder plate of non-magnetizable material, said cylinder plate having oppositely facing sides and a plurality of cylinders extending into one of said sides, a clamping plate of non-magnetizable material situated against another of said sides, said clamping plate providing a surface for clamping an object thereagainst, a closing plate defining a hollow space between said closing plate and said one side of said cylinder plate, a piston plate situated in said hollow space, said piston plate being movable toward and away from said one side of said cylinder plate, a plurality of pistons made at least partly from magnetic material, said pistons being fixed to said piston plate and being removable in respective cylinders, and a pair of fluid transfer channels connected to said hollow space on opposite sides of said piston plate, whereby said piston plate may be moved toward and away from said clamping plate by applying pressure to one of said channels.

3. A magnetic clamping device as in claim 2 wherein said cylinders are cylindrical openings.

4. A magnetic clamping device as in claim 2 wherein said piston plate comprises a magnetizable steel.

5. A magnetic clamping device as in claim 2 wherein said pistons are made from a magnetic material selected from the group consisting of NdFeB and SmCo.

6. A magnetic clamping device as in claim 2 wherein said cylinders extend from said one of said sides to said other of said sides.

7. A magnetic clamping device as in claim 6 wherein said piston plate comprises a layer of magnetizable steel on an aluminum base plate.

* * * * *